March 13, 1956 R. P. GUTTERMAN ET AL 2,737,864
BOREHOLE CAMERA
Filed Nov. 9, 1951 2 Sheets-Sheet 1
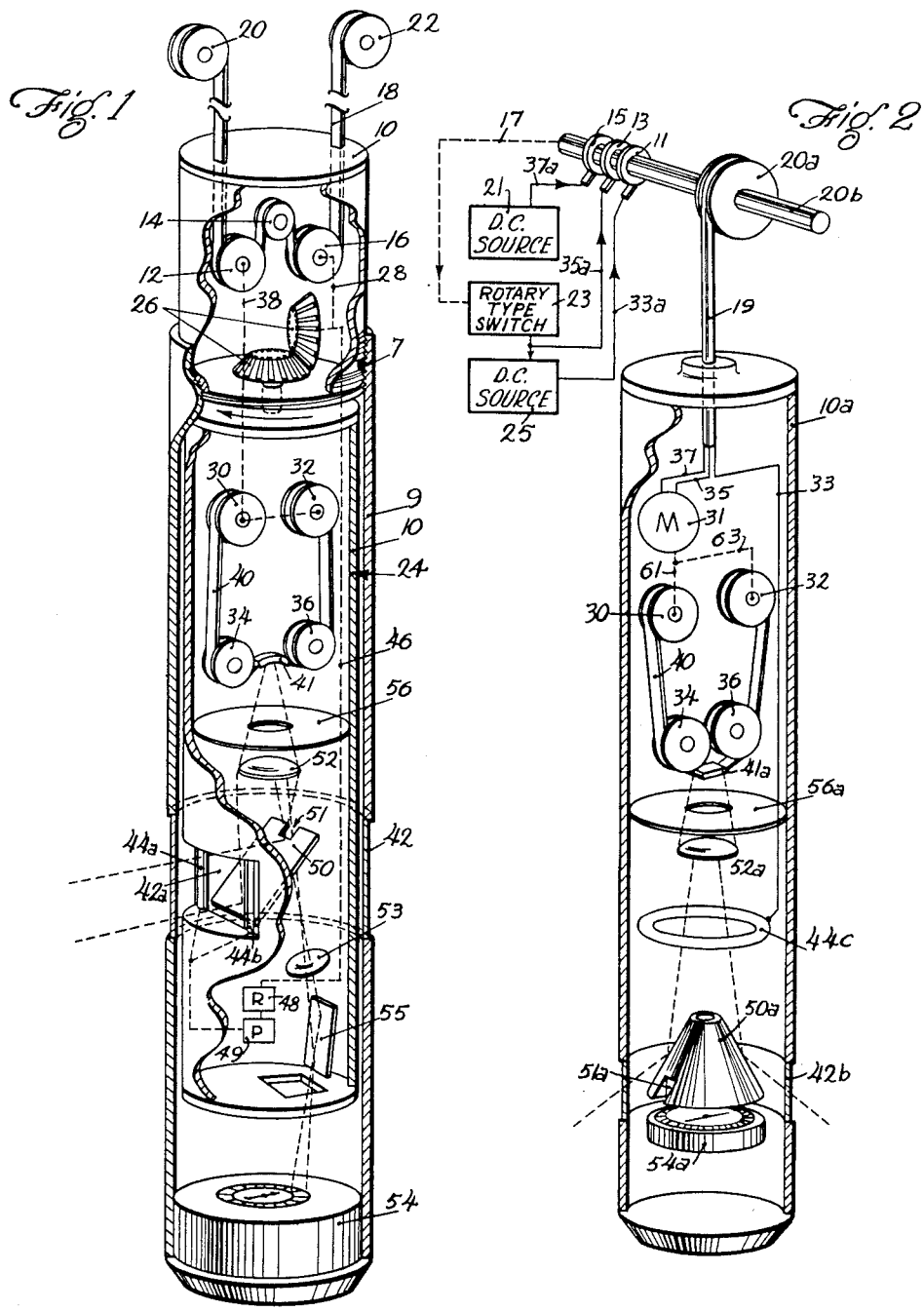
INVENTORS
Charles G. Small
Robert P. Gutterman
By: Robert H. Sorensen
Agent March 13, 1956 R. P. GUTTERMAN ET AL 2,737,864
BOREHOLE CAMERA Filed Nov. 9, 1951 2 Sheets-Sheet 2

INVENTORS
Charles G. Small
Robert H. Gutterman
By
ATTORNEYS

United States Patent Office 2,737,864
Patented Mar. 13, 1956

2,737,864

BOREHOLE CAMERA

Robert P. Gutterman, Silver Spring, Md., and Charles G. Small, St. Paul, Minn., assignors, by mesne assignments, to the United States of America as represented by the Secretary of the Army Application November 9, 1951, Serial No. 255,672

3 Claims. (Cl. 95—11)

This invention is concerned with mobile photographic systems, and particularly with apparatus for photographing the internal surface of a deep vertical hole of small and substantially uniform diameter.

The general theory and uses of automatic remote-control cameras are by now well known in the art, but the present invention contains many novel features which cooperate in making this camera much more satisfactory than any heretofore known in bore hole surveying. Devices used prior to this time have been beset with numerous design and operational difficulties, such as need for special film, optical complications resulting from encountering water in the bore hole, need for complicated and delicate shutter mechanisms, difficulty in synchronizing the rate of photography and the rate of descent of the camera, and the like.

The present invention offers a unique means for securing photographic surveys of bore hole interiors without the numerous difficulties cited above, and with a much simpler mechanism than has heretofore been employed. This invention, in one embodiment shown herein, eliminates the necessity for external driving power to the camera mechanism, such power being derived from the action of gravity on the camera and lowering mechanism. In another embodiment, a novel method for power transmission and synchronization of the camera components through the lowering means is disclosed. Conventional shutter mechanisms are not required in either embodiment, since instantaneous exposures of film are made with light supplied by a gas-filled discharge tube whose flashing frequency is mechanically proportioned to the rate of descent.

It is accordingly an object of this invention to provide, as one embodiment, a bore-hole camera requiring no external source of driving power.

It is a further object of this invention to provide, as one embodiment, a bore-hole camera needing no external source of electricity for itself or its associated machinery.

It is yet a further object of this invention to provide, as a second embodiment, a bore-hole camera in which the operation of the motive power and film-flashbulb are controlled by pulses transmitted through the lowering apparatus.

It is another object of this invention to provide a bore-hole camera which is characterized by little or no axial oscillation during descent.

It is another object of this invention to provide a bore-hole camera which requires no spring-powered motors to make it operate.

It is a still further object of this invention to provide a bore-hole camera which makes use of standard film and ordinary optical components.

It is yet another object of this invention to provide a bore-hole camera utilizing no shutter mechanism.

It is still another object of this invention to provide a bore-hole camera which will operate satisfactorily in either air or water without change of lens focus.

It is yet a further object of this invention to provide a bore-hole camera furnishing automatic and reliable synchronism between film speed and the rate of descent over a wide range of speeds.

It is another object of this invention to provide a bore-hole camera which records an indication of the azimuthal bearing of the camera equipment.

It is yet another object of this invention to provide a bore-hole camera which is of rugged and durable construction, suitable for penetrating and optically surveying vertical apertures inaccessible to human beings.

Other objects and advantages will become apparent from the following description, taken in connection with the accompanying drawings wherein the invention is embodied in specific form.

Referring to the drawings:

Figure 1 represents the basic elements of one embodiment of our invention, requiring no external source of power.

Figure 2 shows a second embodiment involving certain modifications of the structure of Figure 1, and also involving the transmission of power through a lowering cable.

Figure 3:
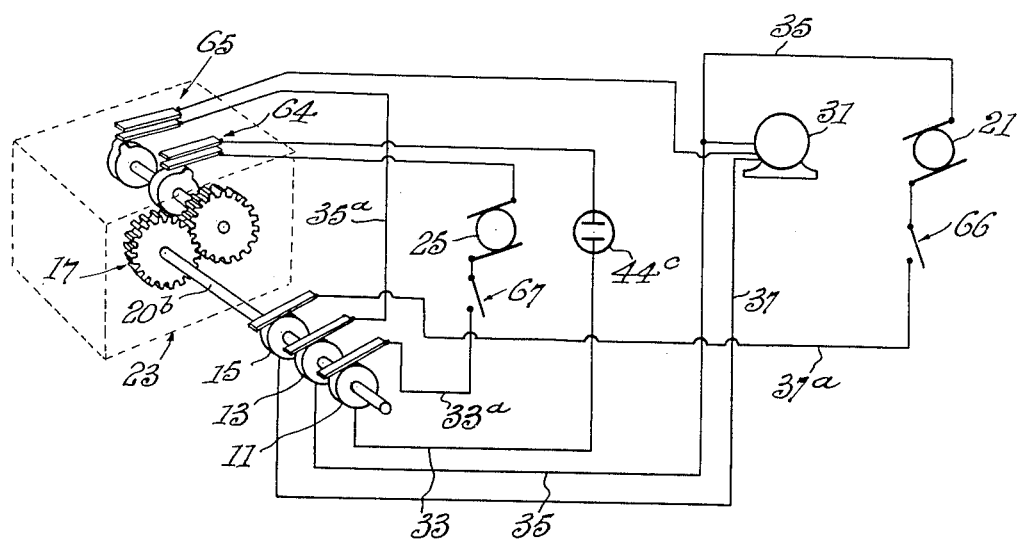
Fig. 3 is a detailed circuit diagram of the electrical components of the embodiment shown in Fig. 2.

Referring now to Figure 1, the invention is shown to comprise a cylindrical outer housing 9, within which is another inner cylindrical housing 10. The space between the surfaces of the outer and inner housings 9, 10 is secured at the top end by a circular sealing member 7. To the top end of housing 10 are journalled three pulleys 12, 14, 16. The housing 9 is supported by a strong flexible tape 18, the two ends of which are connected respectively to each of two lowering drums 20 and 22, both of which are outside and completely separate from housing 9 and its parts. The tape 18 is looped over the pulleys 12, 14, 16 as shown, thereby supporting housing 9. As tape is paid off the drum 20, housing 9 will descend to a depth equal to one-half the length of tape 18 thus paid, the other end of the tape being temporarily held fixed at drum 22. This method of tape support has the additional advantage of minimizing any axial oscillation of housing 9 as it descends; a flat elongated tape member has been found to be much more resistant to twisting than an ordinary wire or cable. Normally it is expected that drums 20, 22 will be part of some general above-ground raising and lowering apparatus, which is not the subject of this application, and that the housing 9 and its contents will thereby be lowered into the hole.

The lower portion of inner housing 10 is referred to as the camera section, represented generally at 24 and is joined pivotally to 9, but is free to rotate about their common axis, as hereinafter described. Rotation is produced through gears 26 which are driven by pulley 16 through a suitable mechanical linkage represented by 28. Such rotation is therefore accurately and automatically synchronized with the rate of descent of housing 9.

In camera section 24 are journalled a film feed-spool 30, a film take-up spool 32, and two idler spools 34, 36. As housing 9 descends into the hole, a suitable mechanical linkage represented by 38 from pulley 12 rotates spools 30 and 32 which are linked together as shown, thus causing the photosensitive film 40 to advance in automatic synchronism with the rate of descent.

Successive pictures are taken through a fully cylindrical window 42 in outer housing 9, made of a tough transparent material such as fused quartz, for example. A partially cylindrical aperture 42a provides a "sight" to the camera apparatus within camera section 24. Two flashbulbs 44a, 44b are simultaneously and repetitively ignited in synchronism with the rate of descent. Such synchronism is a result of the connection of pulley 16 via linkages 28, 46 to a rotary type switch 48 shown as R and Figure 1, which by suitable gearing causes its internal contacts 64 and 65 to regularly open and close. Said contacts alternately connect to and disconnect from the flashbulbs an electric current produced by power source 49 shown as P, which may for example be a battery of suitable voltage. Both components P and R are devices well known in the art and do not require further explanation here.

Light from flashbulbs 44a, 44b illuminates the surface of the bore hole adjacent to aperture 42a, but is prevented by suitable optical shielding 56 from shining upon the film 40. Light from the momentarily illuminated bore hole passes through window 42, is reflected by plane mirror 50, and is focused by lens 52 onto film 40. The duration of the flash is sufficiently short that no blurring of the film will result even though the image constantly changes as the camera section revolves. The frame of film upon which the image impinges is cylindrically bent by curved film gate 41; the purpose of gate 41 is to compensate for and remove the cylindrical distortion which will be present in the reflected image.

Those skilled in the photographic art will at once see that the various mechanical linkages and optical components may be so adjusted in value as to produce a series of pictures which in effect generates a helix of constant pitch, the combined length of a desired number of pictures being roughly equal to the length of one 360° helix but providing for a slight overlap between pictures, and the height of the pictures being equal to the pitch of the helix. The lens, mirror, and film positions may also be set so as to keep the picture-sides at constant right-angles to the generated helix.

In case an indication of the azimuthal orientation of the camera at any particular moment is desired, means are provided for indicating this orientation on each frame of film, such means being a magnetic compass 54 pivotally mounted in the bottom portion of housing 9. An optical image of compass 54 is reflected by plane mirror 55, is focussed by lens 53, passes through a notch 51 in mirror 50, and is then focused on the film at gate 41 by lens 52. Thus each frame of film consists of two parts: a picture of a portion of the hole, and a view of the compass bearing at the moment the picture was taken.

It will be recalled here that the depth at which any particular picture is taken is proportional to the length of tape 18 payed off, and therefore proportional to the length of film 40 used up to the time the picture was taken. Thus any particular depth can easily be calculated later on by determining the number of film frames preceding the picture in question.

In connection with the embodiment shown in Figure 1, it should be noted that linkages 28, 38, and 46 are provided with suitable ratchets, arranged so as to disengage the film drive and flashbulb from the rotary type switch when the housing 9 is lifted back out of the hole by drum 20. It is also intended that the ratchet arrangement will be such that lowering of housing 9 by drum 22 will prevent the photographing operations from occurring, by reason of the fact that lowering via drum 22 and raising by drum 20 both turn the ratcheted linkages in the same direction, i. e., with ratchets disengaged. Hence by this means of ratchets which is well known to those skilled in the mechanical art, it is seen that the housing may be lowered by drum 22 to a desired depth without photographing; then the drum 22 may be locked, and the housing 9 lowered still further by drum 20, now causing pictures to be taken.

Referring now to Figure 2 there is exhibited another embodiment of our invention. In some phases of bore-hole surveying, it may be possible to utilize above-ground power sources. In such cases, dependence upon the gravity-powered device of Figure 1 may not be necessary. The structure shown in Figure 2 accordingly involves somewhat different components. Support for a main housing 10a comprises a strong waterproof cable 19 which contains, as part of its structure, three separately insulated current-conducting wires 33, 35, 37. Raising and lowering housing 10a is accomplished by reeling cable 19 onto or from drum 20a, which as before is presumed to be part of some above-ground mechanical hoisting apparatus not the subject of this application. A sizable length of cable 19 is coiled on drum 20a, the end of 19 being so attached to 20a that each end of the conducting wires 33, 35, 37 is led separately through the shaft 20b to its respective slip-ring assembly 11, 13, or 15, said slip-rings being electrically insulated from each other and from the shaft 20b. Thus electric currents may be sent into the wires 33, 35, 37 via slip-rings 11, 13, 15 and lines 33a, 35a, 37a respectively, even when drum 20a is revolving rapidly.

Within the housing 10a are journalled a film feed-spool 30, a film take-up spool 32, and two idler spools 34, 36, over all of which spools passes a photosensitive film 40.

Also in housing 10a is a window 42b, which is fully cylindrical in order that a complete 360° view of the hole may be "seen" by the film. The image of a fully cylindrical portion of the bore hole is reflected upon a conical mirror 50a and focused upon film frame 41a by lens 52a. Illumination of the hole is derived from a circular flashtube 44c, whose operation is explained more in detail below. Suitable optical shielding 56a protects the film from direct exposure to any light, except through lens 52a.

Mirror 50a has a notch 51a cut in its lower edge, through which the camera may "see" the reading of a magnetic compass 54a pivotally mounted directly below mirror 50a. Since the compass 54a is at substantially the same distance from film 41a as mirror 50a, the same lens 52a serves to focus views of both the mirror and the compass simultaneously. As in Figure 1, each consists of two parts, a view of the mirror and a view of the compass-reading.

Spools 30, 32 are caused to rotate at the proper times by motor 31 through mechanical linkages 61, 63 respectively. Motor 31 derives its operating power via line 37 in cable 19 from D. C. voltage source 21. Source 21 may, for example, supply 50 volts D. C. Motor 31, however, will not run unless and until it receives an electric current pulse synchronized with the rotation of shaft 20b via line 35 from pulse source 23.

Pulse source 23 may, for example, be of the rotary type switch described and identified by reference character 48 in Figure 1, the rotary action in the instant case being derived from shaft 20b via linkage 17. Thus the pulses produced by source 23 are automatically in synchronism with the rotation of drum 20a and hence with the ascent or descent of housing 10a. The pulses of source 23 are fed to two elements: first, to motor 31, which is arranged to advance film 40 by exactly one frame on receipt of each pulse; second, to enable D. C. voltage source 25, which delivers a high D. C. voltage pulse e. g., 600 volts to the gas-filled flashtube 44c. Those skilled in the art will immediately see that one may suitably control the operation of motor 31 and the firing of flashtube 44c so that the tube is ignited before the motor can begin to run; after the momentary flash, motor 31 advances the film 40 by one frame in readiness for the next flash. Since the pulses are accurately aligned with the up or down movement of housing 10a the timing may be so adjusted as to cause the pictures of the bore-hole thus taken by the camera to form a series of contiguous coaxial cylinders instead of adjacent helical sections as in the device of Figure 1.

The various sources 21, 25 are equipped with conventional "On-Off" switches 66, 67, by means of which power may be furnished or not, as desired. Thus the actual photographing may be delayed until the device has been lowered to a desired depth, before power to the camera mechanisms is turned on.

As in the device of Figure 1, the depth at which any particular picture is taken is proportional to the length of the supporting member payed off here, cable 19, and hence also proportional to the number of film frames exposed, up to the picture in question. The optical distortion produced by using a conical mirror is not a disadvantage here, since a projector for viewing the film may, by using another conical mirror and a frosted cylindrical viewing screen, exactly reverse the distorting process, recovering the original appearance of the bore hole in 3 dimensions. Such a projector, however, is not the subject of this application.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense. The scope of our invention is to be limited only by the appended claims.

We claim:

1. A bore-hole camera comprising a housing, suspension means including a rotatable shaft and flexible electrical conducting means, said housing being suspended from said shaft by said flexible electrical conducting means, a shutterless camera mounted within said housing, a mirror mounted within said housing, a window in the wall of said housing in juxtaposition with said mirror, said camera being directed at said mirror, electric drive means within said housing connected to said camera for moving the film in said camera, illuminating means mounted within said housing, a plurality of mutually spaced electrical conducting members encircling said rotatable shaft and insulated therefrom, said electric drive means and said illuminating means each electrically connected to one of said plurality of conducting members through said flexible electrical conducting means, a first energizing source connected through one of said plurality of conducting members and said flexible electrical conducting means to said electric drive means, a second energizing source connected through another one of said plurality of conducting members and said flexible electrical conducting means to said illuminating means, circuit interrupting means mechanically coupled to said rotatable shaft for synchronizing the operation of said circuit interrupting means with the rate of travel of said housing, said circuit interrupting means including a plurality of contacts, rotor means engaging said plurality of contacts, said contacts coacting with said rotor means completing circuits in sequence to said electric drive and said illuminating means as said housing is raised and lowered by rotation of said shaft.

2. Apparatus as recited in claim 1, wherein said mirror is cone-shaped and mounted with the apex thereof toward said camera and said window extends circumferentially of said housing.

3. A bore-hole camera comprising a housing, suspension means including a rotatable shaft and flexible electrical conducting means, said housing being suspended from said shaft by said flexible electrical conducting means, photographic recording means mounted within said housing, a conical mirror mounted within said housing with the apex thereof directed toward said photographic recording means, a circumferential window forming a portion of the wall of said housing in juxtaposition with said conical mirror, a magnetic compass mounted within said housing beneath the base of said conical mirror and in axial alignment therewith, the peripheral surface of said conical mirror having a notch adjacent the base thereof, said notch being in register with the indicia of said magnetic compass for simultaneously viewing bearings shown by said magnetic compass and bore-hole surface areas external to the circumferential window by said photographic recording means, electric drive means within said housing connected to said photographic recording means for moving the film therein, a flashtube mounted within said housing, a plurality of mutually spaced electrical conducting members encircling said rotatable shaft and insulated therefrom, said electric drive means and said flashtube each electrically connected to one of said plurality of conducting members through said flexible electrical conducting means, a first energizing source connected through one of said plurality of conducting members and said flexible electrical conducting means to said electric drive means, a second energizing source connected through another one of said plurality of conducting members and said flexible electrical conducting means to said flashtube, circuit interrupting means mechanically coupled to said rotatable shaft for synchronizing the operation of said circuit interrupting means with the rate of travel of said housing, said curcuit interrupting means including a plurality of contacts, rotor means engaging said plurality of contacts, said contacts coacting with said rotor means completing circuits in sequence to said electric drive and said flashtube as said housing is raised and lowered by rotation of said shaft.

References Cited in the file of this patent

UNITED STATES PATENTS

| | | |
|---|---|---|
| 1,658,537 | Reinhold | Feb. 7, 1928 |
| 2,338,028 | Doll | Dec. 28, 1943 |
| 2,341,745 | Silverman et al. | Feb. 15, 1944 |
| 2,632,801 | Donaldson | Mar. 24, 1953 |
| 2,633,783 | Laval | Apr. 7, 1953 |

FOREIGN PATENTS

| | | |
|---|---|---|
| 19,215 | Great Britain | of 1913 |
| 287,488 | Germany | Sept. 25, 1915 |
| 586,132 | Germany | Oct. 18, 1933 |
| 616,842 | Great Britain | Jan. 27, 1949 |